United States Patent [19]

McDougall

[11] Patent Number: 5,071,021
[45] Date of Patent: Dec. 10, 1991

[54] TANK LID

[75] Inventor: James S. McDougall, Angaston, Australia

[73] Assignee: S. Smith & Son Pty. Ltd., Angaston, Australia

[21] Appl. No.: 712,933

[22] Filed: Jun. 10, 1991

[30] Foreign Application Priority Data

Jun. 22, 1990 [AU] Australia .............................. PK0760

[51] Int. Cl.⁵ .......................................... B65D 51/16
[52] U.S. Cl. .................................... 220/209; 220/366
[58] Field of Search ............... 220/203, 209, 256, 366; 215/260

[56] References Cited

U.S. PATENT DOCUMENTS 2,865,531 12/1958 Gorst et al. ..................... 220/366 X
4,116,357 9/1978 Stanley, Jr. ......................... 220/205
4,151,929 5/1979 Sapien .................................. 220/404
4,736,864 4/1988 Whitford ............................ 220/209
4,896,789 1/1990 Federspiel .......................... 220/367
4,971,219 11/1990 Dombeck et al. .................. 220/303

Primary Examiner—Gary E. Elkins
Assistant Examiner—Nova Stucker
Attorney, Agent, or Firm—Webb, Burden, Ziesenheim & Webb

[57] ABSTRACT

A tank lid has a membrane of sufficient dimension to overlap the peripheral lip of a tank neck, an aperture in the membrane which opens to a space beneath an imperforate membrane support supporting the periphery of the membrane, and brackets arranged to be secured to the tank neck to be outstanding therefrom, and in use, to carry the membrane support when the lid is in a (normal) closed position.

7 Claims, 3 Drawing Sheets

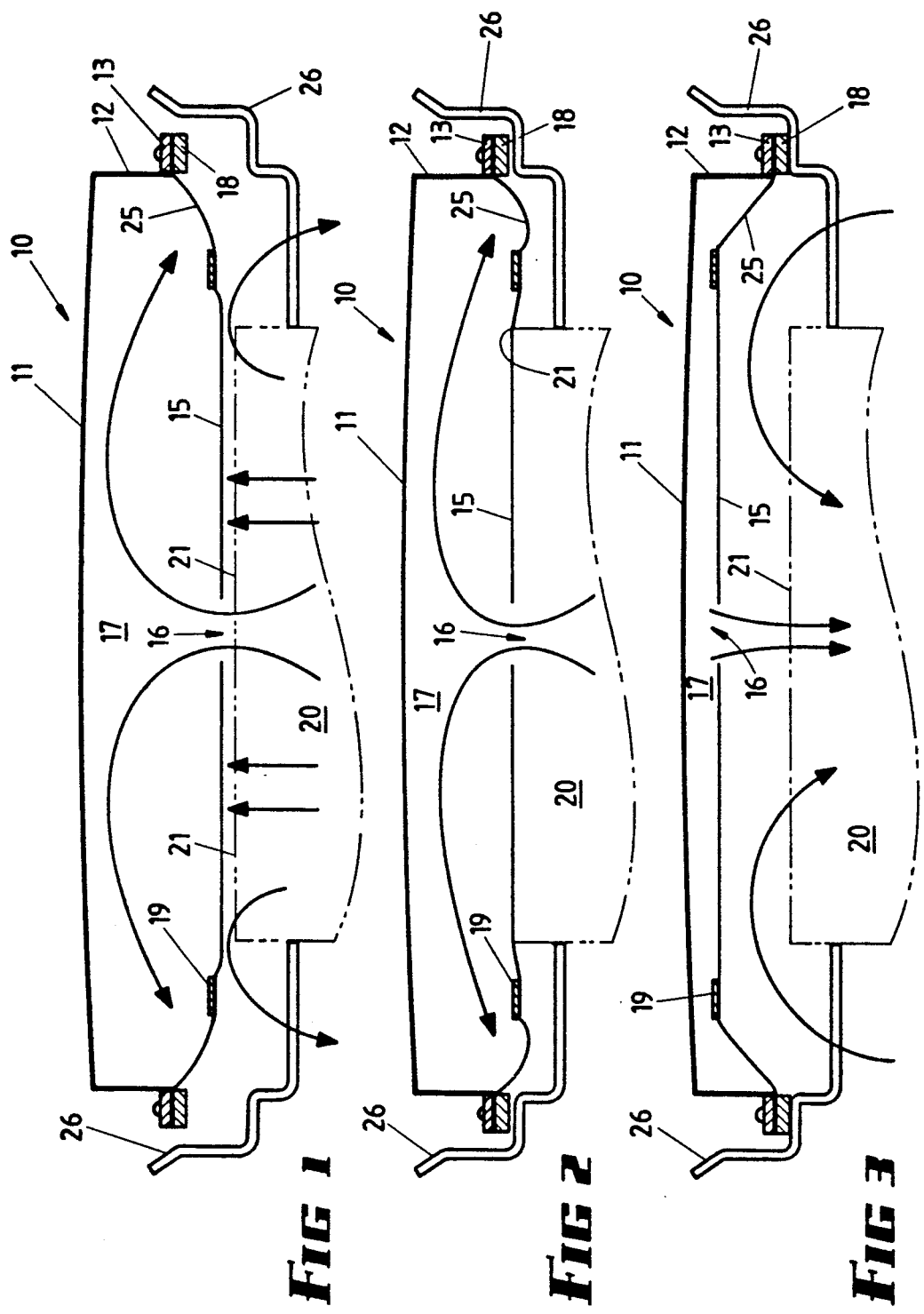

TANK LID

This invention relates to a tank lid which is particularly useful for a large tank as used in the wine industry, but it will be seen the invention also has application in other fields such as the petrochemical industry.

BACKGROUND OF THE INVENTION

Implosion of thin wall stainless steel tanks in the wine industry has been very prevalent and costly and over the years many attempts have been made to solve the problem of providing a seal which is readily broken upon rapid drop of pressure within the tank, due for example to rinsing with cold water after a hot caustic wash, or by egress of contents of a wine tank by pumping out wine, and which will allow air to replace the space previously occupied by the liquid. Because of the failure of prior art tank lids to satisfy all requirements, implosions still occur regularly and the cost of a large wine tank is very high. Overpressurisation can occur due to many operational reasons and can also seriously damage tanks. One of these reasons is the reaction of ferments which produces voluminous amounts of carbon dioxide gas as well as expanding the liquid contents by heating, the reaction being exothermic.

A commercial pressure-vacuum valve is known to exist, comprising an annular membrane which depends from an annular frame, and seals around a valve seat when there is no pressure differential between the interior of a tank and surrounding atmosphere, or when there is pressure in the tank, but lifts away from the valve seat under vacuum conditions within the tank. Upon pressure conditions occurring within the tank, a pressure valve carried by the annular frame will lift to allow egress of air from the tank. There are several reasons given by wine makers for not widely adopting use of such valves, including cost, size, complexity, and fear of adhesion between the membrane and valve seat, which is a machined seat.

The most successful attempt which has been made heretofore to avoid implosion of a wine tank and is known to the applicant is embodied in applicant's U.S. Pat. No. 4736864 for a tank lid of a different type from that disclosed in this invention, but although tank lids according to that invention have been reasonably successful there is still room for improvement in certain aspects. Particularly the lid must allow free ingress of air when vacuum occurs inside the tank, such as to prevent vacuum in the tank exceeding 50 mm of water gauge at any flow rate, and flow rate can be as much as 0.5 $m^3$ per second in a 100,000 liter tank. Secondly, it is desirable that the lid should last for many years without deterioration in its operation and should avoid having any finish machined surfaces because of cost, nor any adjustable items that could require periodical resetting. Further, if used for wine the tank neck lip will normally become contaminated with sticky wine residue, and the tank lid must be capable of maintaining pressure/vacuum specifications by overcoming the adhesive effects of the wine residue. Still further, it is desirable that the tank lid should be operable to allow a tank washing spray ball to pass through the tank lid and at that time to maintain its pressure/vacuum control phases.

Still further, the lid should be capable of alternating between pressure and vacuum modes without attention from any person. These are only five of twenty desiderata which have been identified and may be regarded as requirements for a tank lid, although they include the five most difficult to achieve.

BRIEF SUMMARY OF THE INVENTION

The main object of this invention therefore is to provide a tank lid which will function to achieve all the abovementioned objects as well as other well known requirements of a tank lid, and in an embodiment a tank lid has a membrane of sufficient dimension to overlap the peripheral edge of a tank neck, an aperture in the membrane which opens to a space beneath an imperforate membrane support supporting the periphery of the membrane, and brackets arranged to be secured to a tank neck to be outstanding therefrom, and in use, to carry the membrane support when the lid is in a (normal) closed position.

Since the membrane support is itself imperforate, under normal operating conditions the same pressure will exist in the space between the membrane and support as exists in the tank. Under vacuum conditions however a low pressure will be drawn above the membrane and the higher atmospheric pressure acting on the membrane annulus where it overlaps the tank neck will initially lift the membrane away from the lip of the neck, allowing ingress of air the flow of which will retain the membrane lifted. The third mode is when the pressure within the tank increases and that pressure operates so as to lift the membrane and all the elements of the lid from the lip of the tank neck.

More specifically, the invention consists of a tank lid suitable for sealing a tank around a lip which defines an opening in a neck of the tank, comprising a rigid imperforate membrane support, a membrane of dimension exceeding the dimension of the opening, means sealably securing the periphery of the membrane to the membrane support, an aperture in the membrane opening to space between the membrane and said support, and brackets arranged to be outstanding from the neck to carry the membrane support when the lid is in a normal (closed) position.

BRIEF DESCRIPTION OF THE DRAWINGS

An embodiment of the invention is described hereunder in some detail with reference to and as illustrated in the accompanying drawings in which FIG. 1 is a diagrammatic sectional representation of a tank lid associated with a tank neck under conditions of excess pressure within a tank allowing egress of gases from within the tank between the tank lid and the lip of the tank neck;

FIG. 2 is a similar representation illustrating the tank lid under normal operating conditions when it closes the tank by sealing around the lip;

FIG. 3 is also diagrammatic and illustrates the tank lid in use when a vacuum is drawn within the tank, the tank lid then allowing ingress of air;

Figure 4:
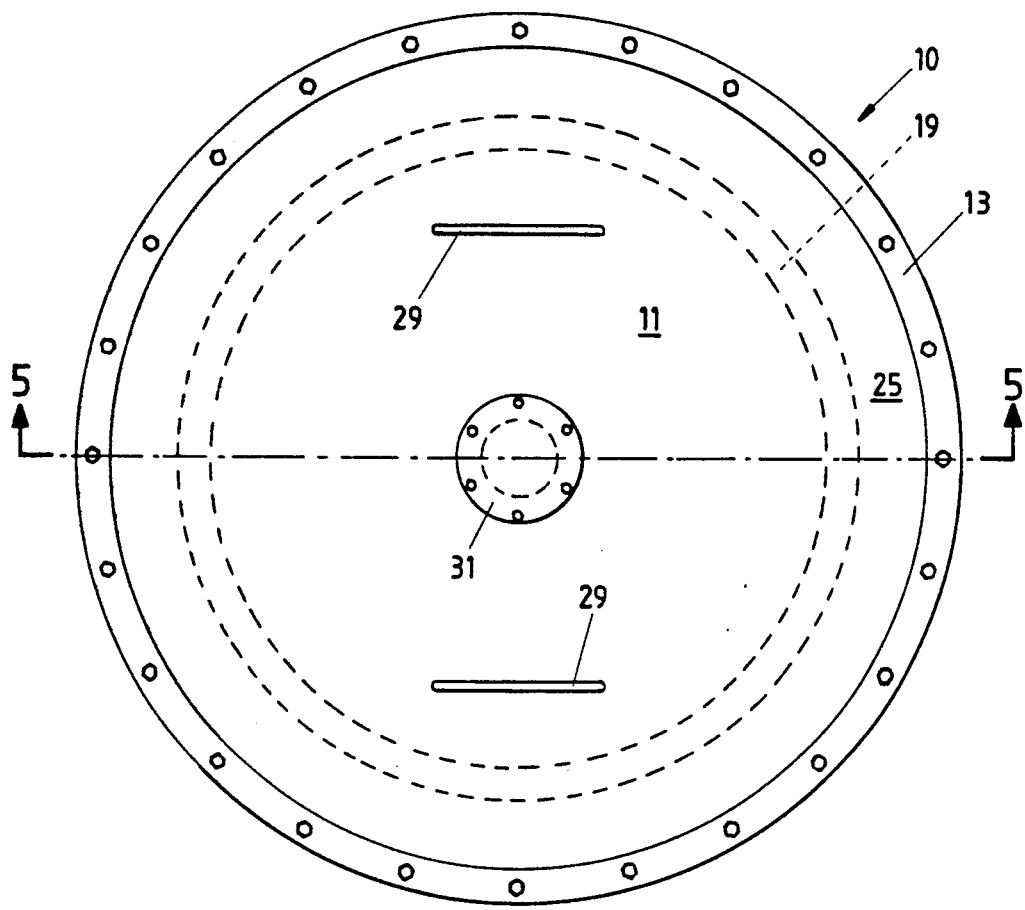
FIG. 4 is a plan view of a lid.

In this embodiment, a tank lid 10 comprises a discoid shaped membrane support 11 made from sheet steel and having an annular skirt 12 depending from it, the skirt 12 terminating in an outstanding planar flange 13.

A membrane 15 has a central aperture 16 which opens to the space 17 between the membrane support 11 and the membrane 15, but is sealed around its edge to the planar flange 13 by means of a clamping ring 18. The membrane 15 is provided also with an internal flat planar annular ring 19 of larger diameter than the neck 20 of the tank but smaller diameter than flange 18. This ring 19 is securely affixed to the membrane and ensures the membrane 15 seals reliably onto the lip 21 of the neck 20. The membrane support 11 is imperforate and the only access to the space 17 between the membrane 15 and the support 11 is through the aperture 16.

Figure 6:
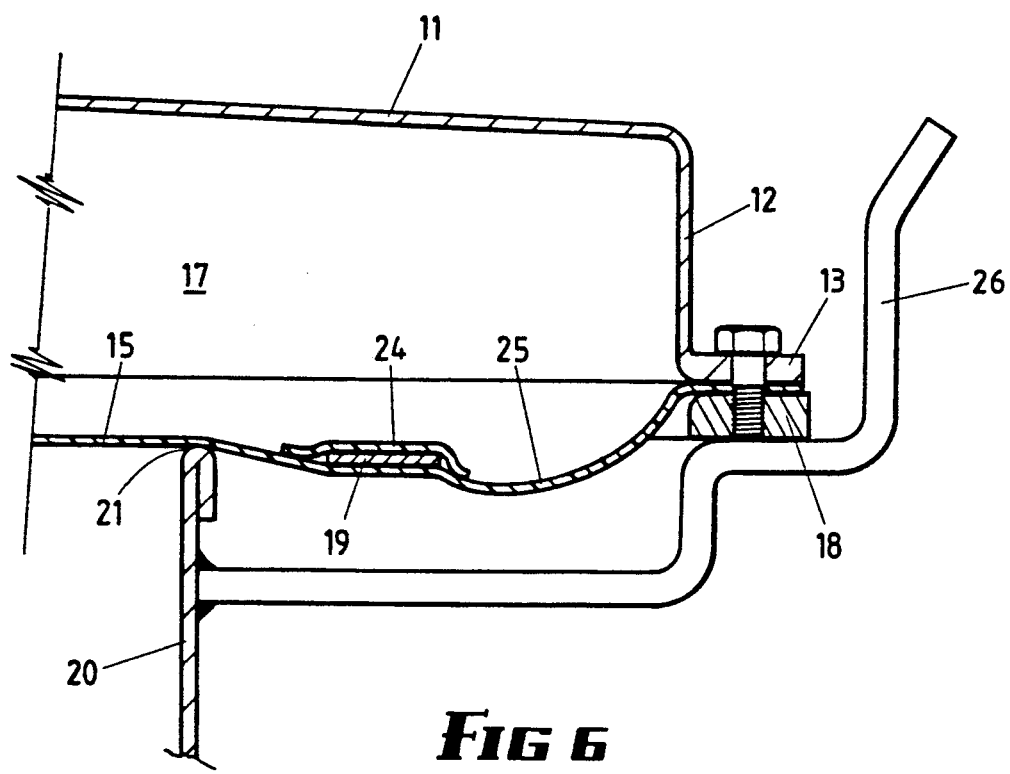
FIG. 6 is a fragmentary section taken in the same plane as FIG. 5, but drawn to a larger scale.

The membrane 15 is formed from a strong but flexible sheet material, in this embodiment a PVC reinforced fabric, and ring 19 is either adhered to it, or is overlaid by an annular PVC ring 24 as shown in FIG. 6. The membrane portion which lies within ring 19 is stretched and held taut thereby, but between ring 19 and flange 13 the radial length of the membrane exceeds the distance (by about 7 mm), so that when the lid closes over lip 21, as shown in FIGS. 2 and 6, the taut portion of the membrane within the ring droops over and seals against the lip notwithstanding imperfections, and the annulus 25 of the membrane itself is slack, but can become taut as the central part of membrane 15 lifts for ingress or egress of gas to or from the tank.

Figure 5:
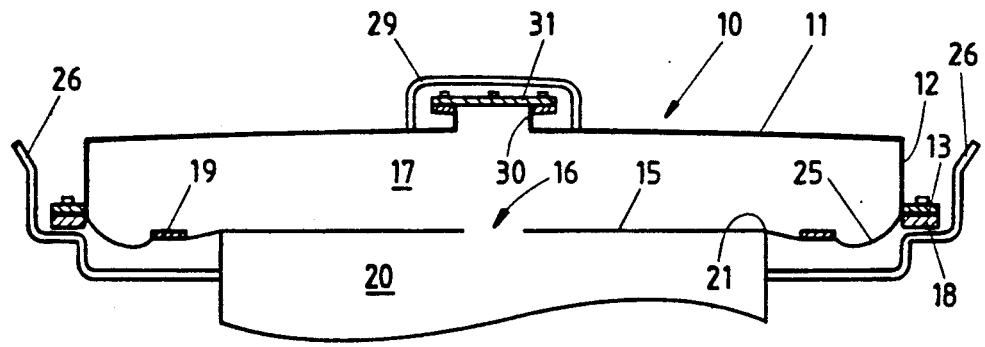
FIG. 5 is a central section taken on line 5—5 of FIG. 4.

When excess pressure exists within a tank, the pressure simply lifts the entire assembly of the membrane support 11 and its membrane 15 away from the lip 21 of the tank neck as illustrated in FIG. 1. The gases readily escape around the periphery of the tank neck 20. When pressure returns to normal, brackets 26 (three in number) guide the support flange 13 to cause the lid 10 to overlie the lip 21 of the neck 20 as illustrated in FIGS. 2, 5 and 6, and in this mode of operation the tank lid substantially seals against ingress or egress of gas.

If however the tank is suddenly subject to a vacuum due for example to condensation of water vapour or discharge of its liquid contents, the pressure of atmospheric air acting against the annulus 25 surrounding the tank neck will cause upward distortion of the membrane 15 as illustrated in FIG. 3 which causes the membrane 15 to "peel" away from the lip (which overcomes any stiction) and this immediately allows an ingress of air through the upper end of the tank neck. The space 17 is subjected to an underpressure due to the vacuum in the neck 20 even when the air is flowing into the tank, and this underpressure needs only to be about 0.4" (10 mm) of water gauge to be sufficient to fully lift the membrane to ensure that the pressure within the tank does not diminish to the point where implosion can occur.

Because the neck of the tank is usually large in diameter, and the differential area of the membrane 15 which is acted upon is correspondingly large, there is ample force available to ensure that the membrane is lifted away from any sticky residue during the transition from the normal operation (FIG. 2) to the vacuum mode (FIG. 3).

There is a safety feature which guards against premature resealing of membrane 15 on lip 21. As seen in FIG. 3, air flowing into the tank changes direction, imparting some upward force on membrane 15, and velocity of flow maintains a low pressure, beneath the membrane, the pressure diminishing as the membrane nears the closure mode, because of velocity increase (the "Bernoulli" effect).

The membrane support 11 is provided with lifting handles 29 (FIGS. 4 and 5), and the central portion of support 11 has a short tubular upstand 30, normally closed by a secondary lid 31 which can be removed to allow a spray emitting ball to be lowered through the lid 10 and into the tank, for cleaning purposes.

The materials used can be widely varied but desirably the membrane 15 is formed from a PVC plasticised fabric for winery use as described above, and the support 11 from 316 grade stainless steel. If the lid is used on motor spirit tanks to inhibit evaporation by containment of the vapour pressure, the membrane material would need to be reinforced Neoprene or Buna material.

A model tank lid made in accordance with the invention has indicated that the membrane 15 is very sensitive to pressure variation, and appears to function very smoothly and reliably.

I claim:

1. A tank lid suitable for sealing a tank around a lip which defines an opening in a neck of the tank, comprising
   a rigid imperforate membrane support, a membrane of dimension exceeding the dimension of the opening, means sealably securing the periphery of the membrane to the membrane support, an aperture in the membrane opening to a space between the membrane and said support,
   and brackets arranged to be outstanding from the neck to carry the membrane support when the lid is in a normal (closed) position.

2. A tank lid according to claim 1 wherein said membrane support comprises a downwardly directed peripheral skirt the lower edge of which terminates in a radially outstanding flange, and said membrane periphery securing means comprises a clamping ring which clamps the membrane periphery against the flange.

3. A tank lid according to claim 2 further comprising an annular ring, and means securing the annular ring to the membrane, said annular ring being of larger diameter than the opening but smaller diameter than the flange.

4. A tank lid according to claim 1 further comprising an annular ring of larger diameter than the opening but smaller diameter than the flange, means securing the annular ring to the membrane, the ring providing sufficient weight and rigidity to hold taut that portion of the membrane which lies within it but the radial dimension of that portion of the membrane which surrounds the ring exceeding the distance between the ring and the flange so that said surrounding portion is slack.

5. A tank lid according to claim 4 wherein, in use, said sealing around the lip is effected solely by engagement of said taut portion of the membrane with the tank lip, with the membrane drooping over the lip.

6. A tank lid according to claim 4 wherein the dimensions and configuration of said tank lid (when installed) are such that, when the membrane is subjected to vacuum, said slack portion of the membrane deflects and the membrane lifts away from the lip of the tank neck under influence of differential pressure and air flow into the tank, while the brackets support the weight of the membrane support.

7. A tank lid according to claim 1 wherein the membrane support has a central tubular upstand, and a removable secondary lid closes the upper end of the upstand.

* * * * *